United States Patent
Verma

(10) Patent No.: US 11,627,285 B2
(45) Date of Patent: Apr. 11, 2023

(54) SYSTEM AND METHOD FOR DETERMINING REAL-TIME RESOURCE CAPACITY BASED ON PERFORMING PREDICTIVE ANALYSIS

(71) Applicant: BANK OF AMERICA CORPORATION, Charlotte, NC (US)

(72) Inventor: Sandeep Verma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/392,589

(22) Filed: Aug. 3, 2021

(65) Prior Publication Data
US 2023/0037784 A1    Feb. 9, 2023

(51) Int. Cl.
| | |
|---|---|
| H04N 7/18 | (2006.01) |
| G06T 7/50 | (2017.01) |
| H04L 67/141 | (2022.01) |
| G06Q 20/10 | (2012.01) |
| G06V 20/52 | (2022.01) |
| G06V 40/16 | (2022.01) |
| H04L 67/52 | (2022.01) |
| H04L 67/50 | (2022.01) |

(52) U.S. Cl.
CPC ........... *H04N 7/18* (2013.01); *G06Q 20/1085* (2013.01); *G06T 7/50* (2017.01); *G06V 20/52* (2022.01); *G06V 40/172* (2022.01); *H04L 67/141* (2013.01); *H04L 67/52* (2022.05); *H04L 67/535* (2022.05); *G06T 2207/30196* (2013.01)

(58) Field of Classification Search
CPC ........ H04N 7/18; G06Q 20/1085; G06T 7/50; G06T 2207/30196; G06V 40/172; G06V 20/52; H04L 67/141; H04L 67/52; H04L 67/535

USPC .................................................. 348/143, 150
See application file for complete search history.

(56) References Cited

U.S. PATENT DOCUMENTS

2010/0217656 A1* 8/2010 Bouget .................. G06Q 30/02
345/419
2020/0410824 A1* 12/2020 Bhuvad ................ G06V 40/172

FOREIGN PATENT DOCUMENTS

| CA | 2998274 A1 * | 9/2018 |
| JP | 2014119790 A * | 6/2014 |

(Continued)

*Primary Examiner* — David R Lazaro
*Assistant Examiner* — Mariegeorges A Henry
(74) *Attorney, Agent, or Firm* — Moore & Van Allen PLLC; Nicholas C. Russell

(57) ABSTRACT

Embodiments of the present invention provide a system for determining real-time resource capacity of entity devices based on performing predictive analysis. In particular, the system may be configured to identify one or more users at a location of an entity device waiting to perform one or more interactions via the entity device, establish a communication link with the entity device, determine identity of the one or more users based on communicating with the entity device, calculate an estimated interaction amount associated with the one or more interactions of the one or more users, determine capacity of the entity device in real-time, identify that the capacity of the entity device does not meet the calculated estimated interaction amount, and transmit a notification to at least one user of the one or more users via the entity application present on a user device of the at least one user.

17 Claims, 7 Drawing Sheets

(56) References Cited

FOREIGN PATENT DOCUMENTS

JP    2019133372 A  *  8/2019
WO   WO-2017031504 A1 *  2/2017  ............. G06F 21/34

* cited by examiner

SYSTEM AND METHOD FOR DETERMINING REAL-TIME RESOURCE CAPACITY BASED ON PERFORMING PREDICTIVE ANALYSIS

BACKGROUND

There exists a need for a system to perform predictive analysis for determining real-time resource capacity associated with entity devices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for determining real-time resource capacity of entity devices based on performing predictive analysis. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more users at a location of an entity device waiting to perform one or more interactions via the entity device, establishes a communication link with the entity device, determines identity of the one or more users based on communicating with the entity device, via the communication link, confirms the identity of the one or more users via an entity application present on one or more user devices of the one or more users, calculates an estimated interaction amount associated with the one or more interactions of the one or more users based on the identity of the one or more users, via an artificial intelligence engine, determines capacity of the entity device in real-time, via the communication link, identifies that the capacity of the entity device does not meet the calculated estimated interaction amount, and, transmits a notification to at least one user of the one or more users via the entity application present on a user device of the at least one user.

In some embodiments, the present invention determine the identity of the one or more users based on extracting real-time feed from a camera of the entity device, via the communication link and performing facial recognition based on the real-time feed from the camera of the entity device.

In some embodiments, the present invention determines a sequence of the one or more users waiting in a queue based on the real-time feed from the camera of the entity device.

In some embodiments, the present invention determines the sequence of the one or more users based on calculating a distance of the one or more users from the entity device based on the real-time feed from the camera of the entity device.

In some embodiments, the present invention draws a virtual line before the at least one user based on determining that the capacity of the entity device does not meet the calculated estimated interaction amount of the one or more users, wherein the virtual line is drawn on the real-time feed from the camera of the entity device.

In some embodiments, the present invention confirms the identity of the one or more users based on determining that a geolocation of the one or more users matches the location of the entity device.

In some embodiments, the present invention calculates the estimated interaction amount based on at least one of interaction history and location of the entity device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
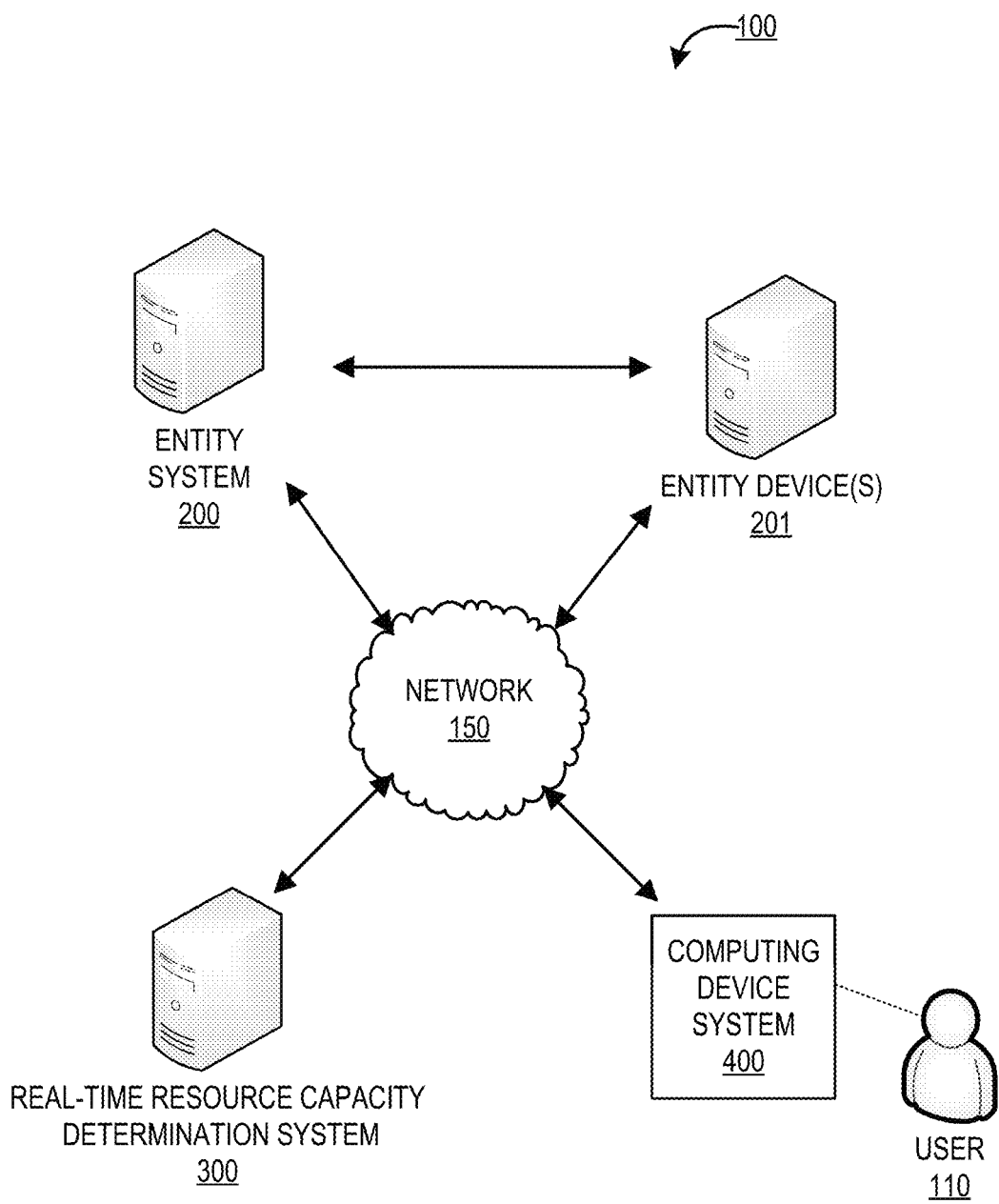
Figure 2:
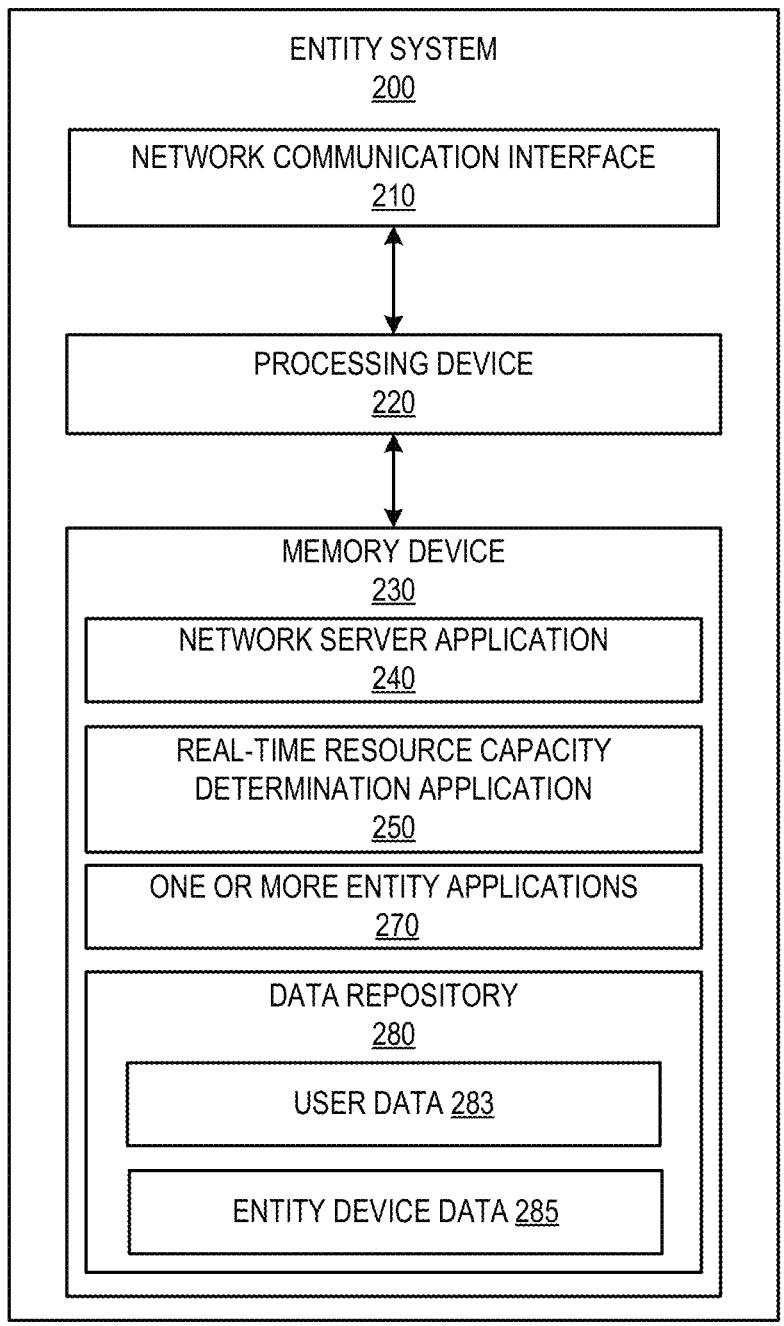
Figure 3:
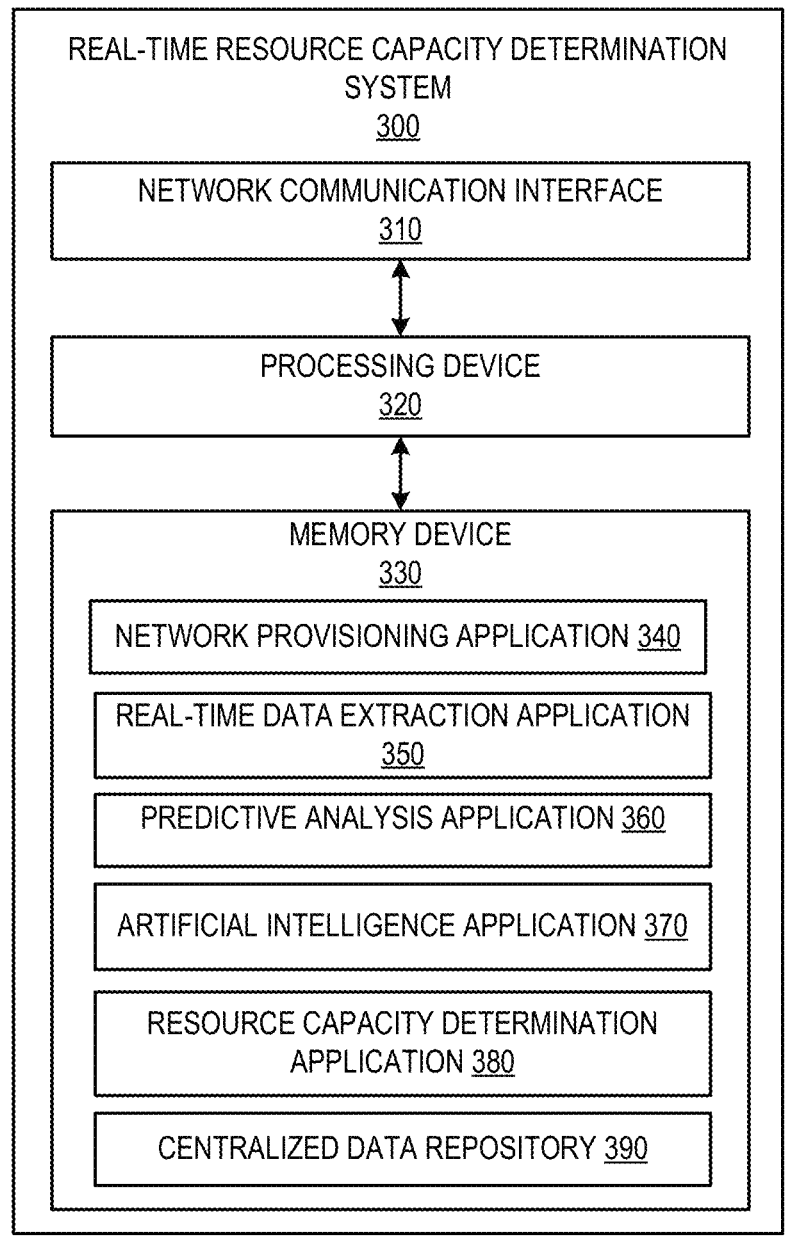
Figure 4:
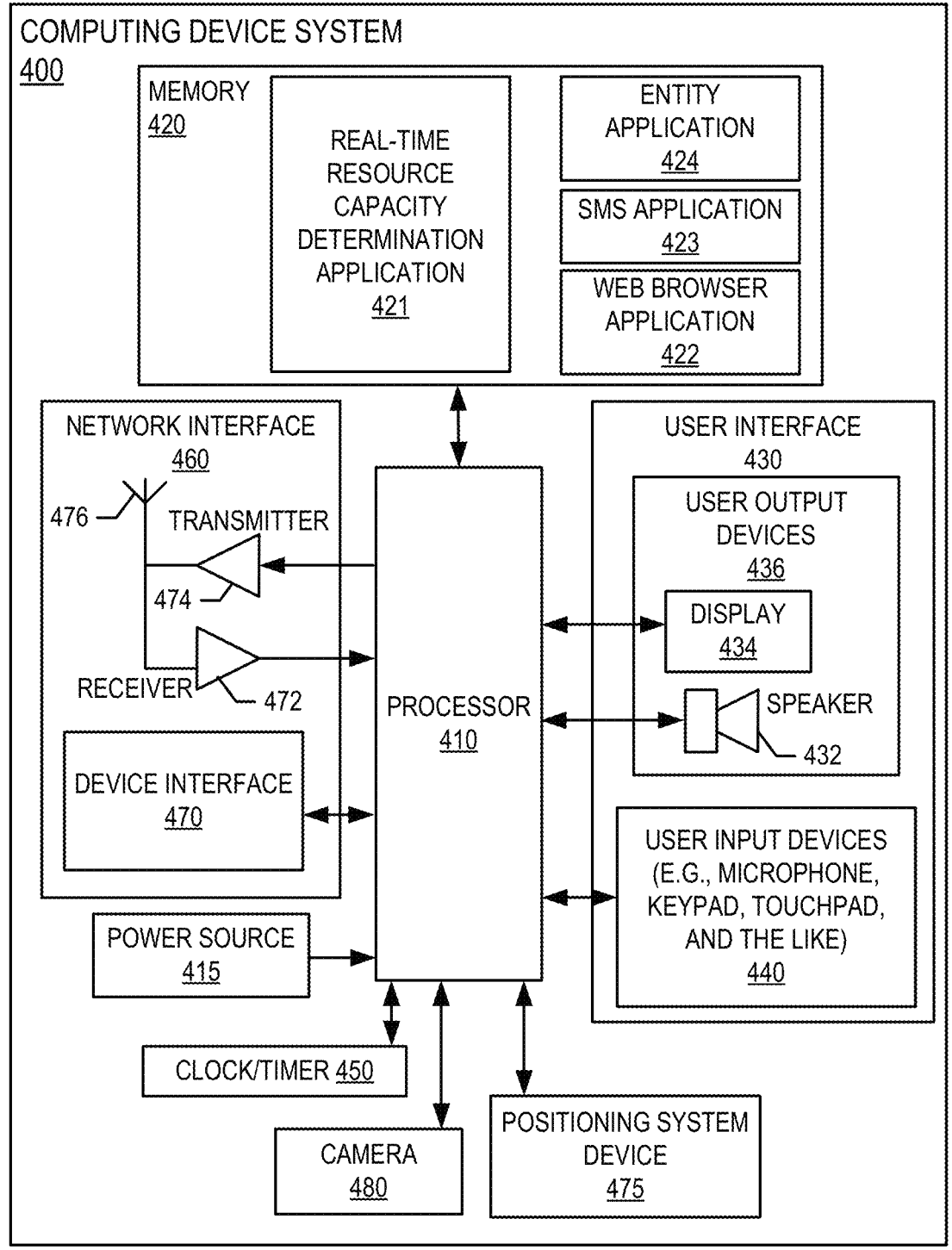
Figure 5:
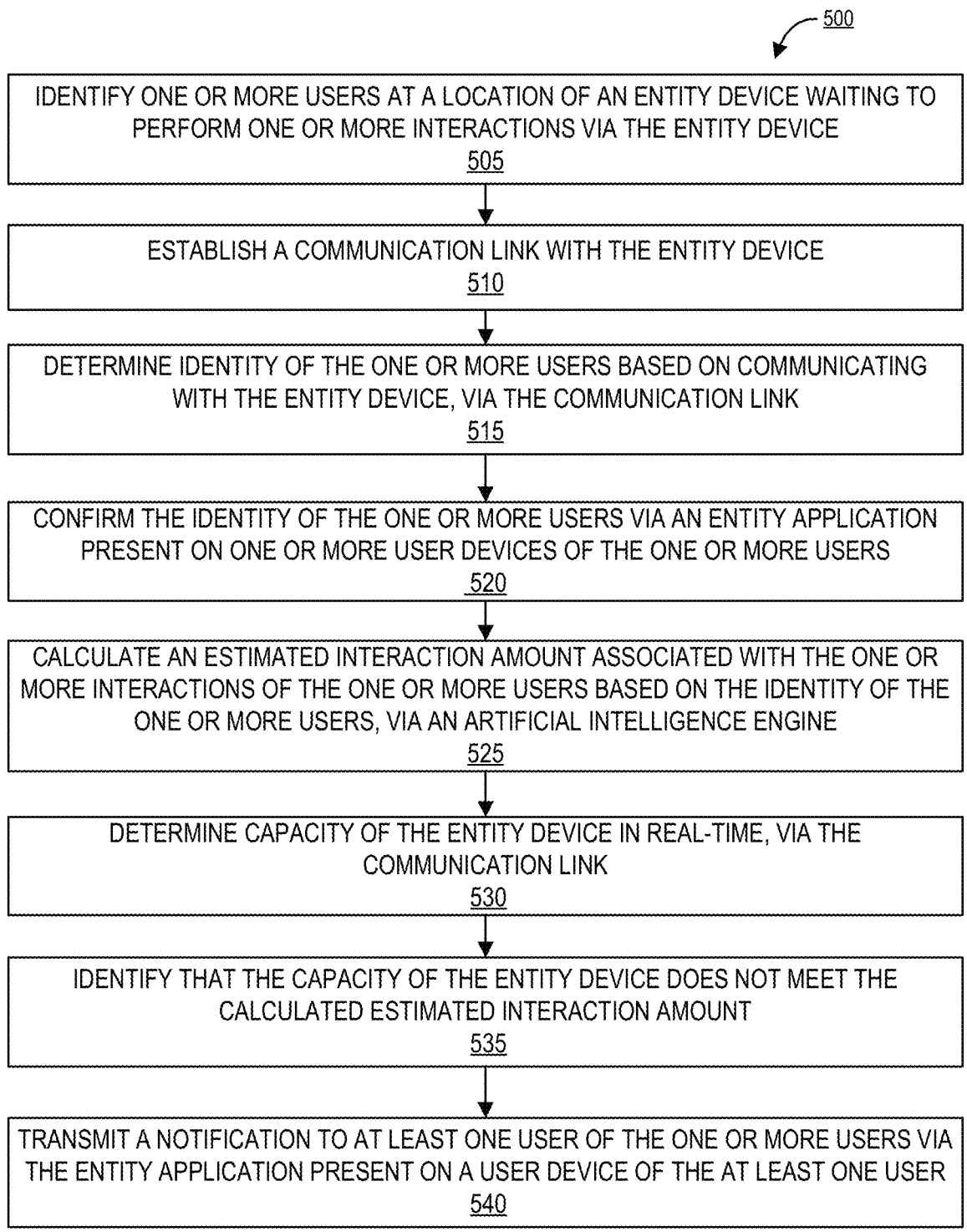
Figure 6:
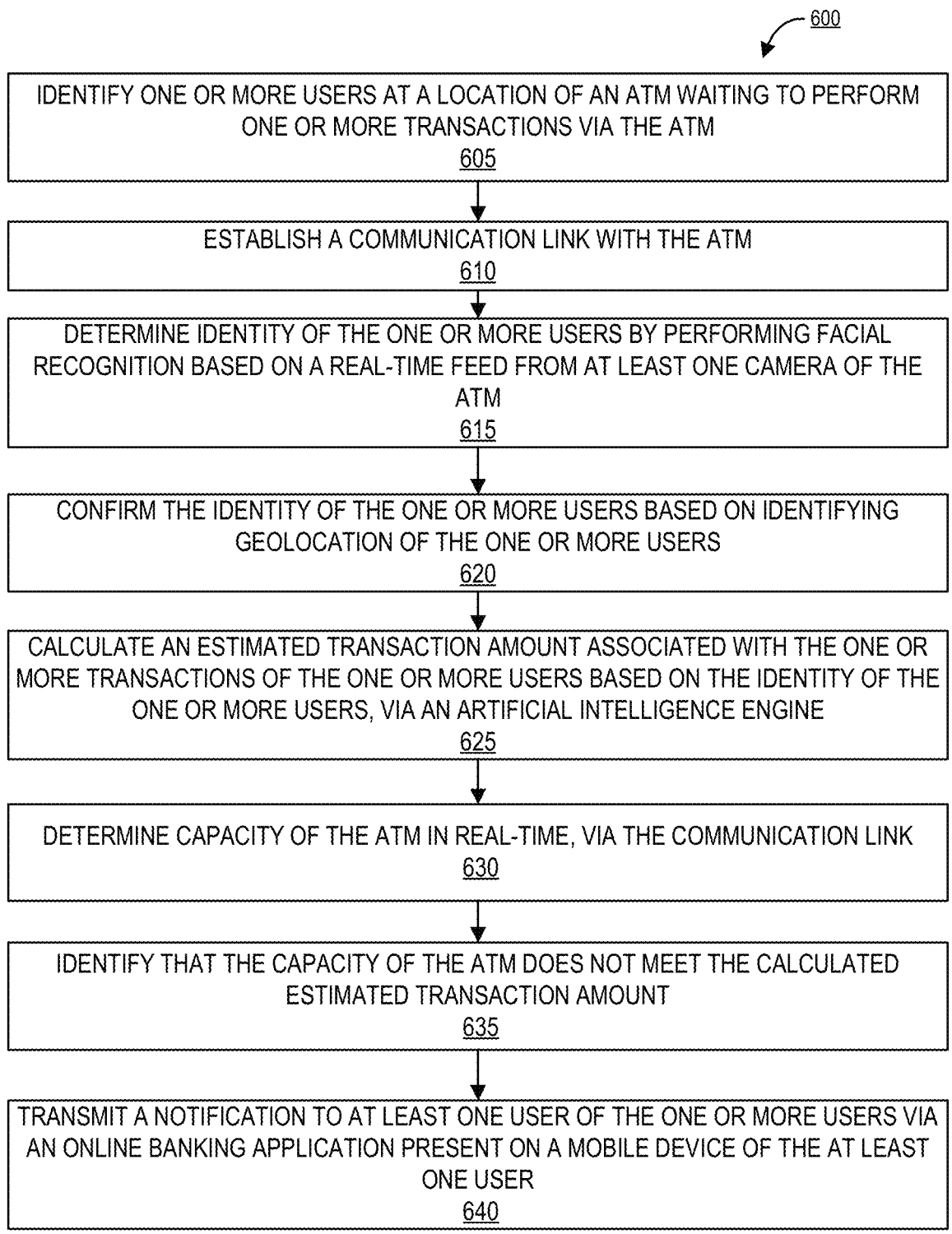
Figure 7:
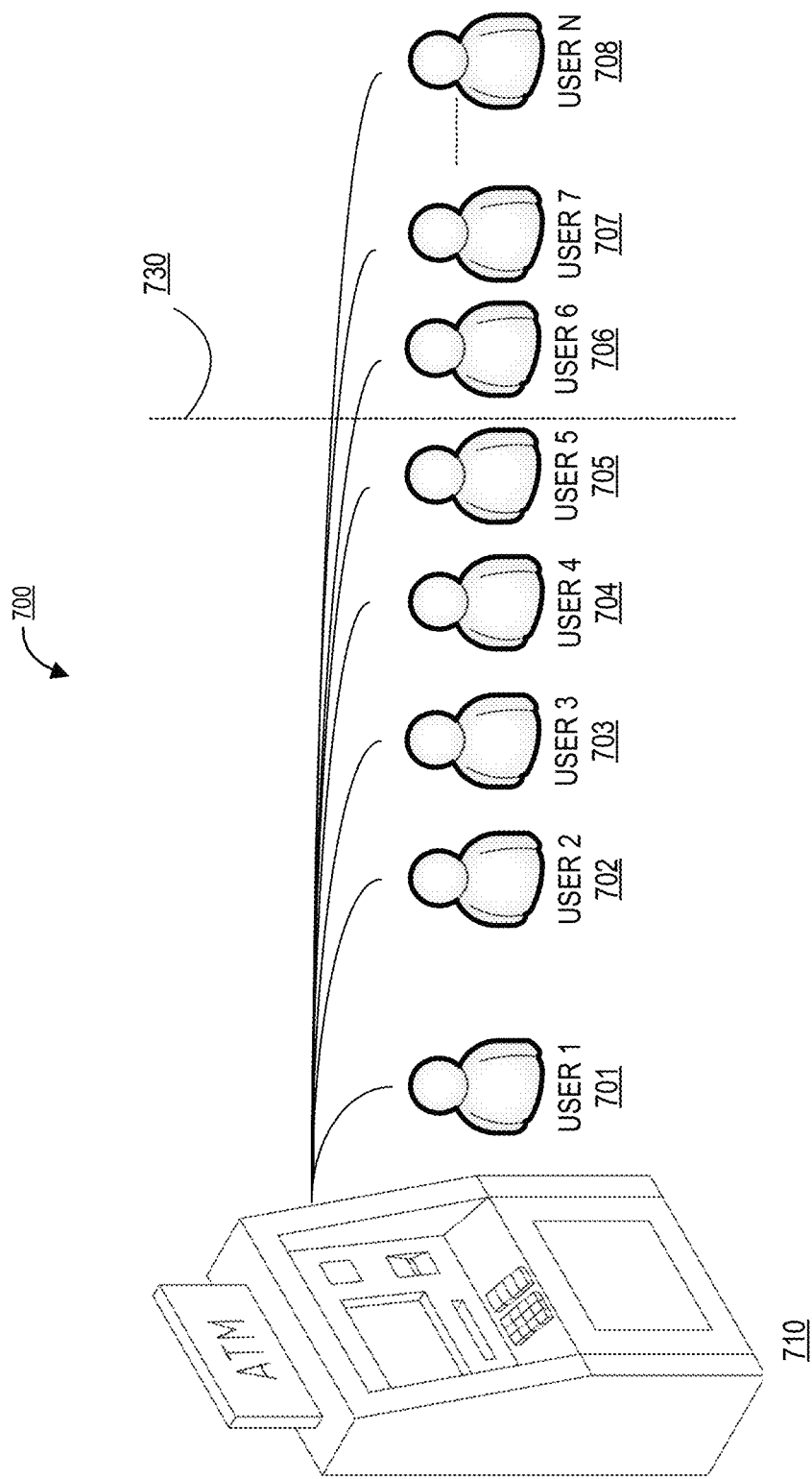

Having thus described embodiments of the invention in general terms, reference will now be made the accompanying drawings, wherein:

FIG. 1 provides a block diagram illustrating a system environment for determining real-time resource capacity of entity devices based on performing predictive analysis, in accordance with an embodiment of the invention;

FIG. 2 provides a block diagram illustrating the entity system 200 of FIG. 1, in accordance with an embodiment of the invention;

FIG. 3 provides a block diagram illustrating an electronic resource request processing system 300 of FIG. 1, in accordance with an embodiment of the invention;

FIG. 4 provides a block diagram illustrating the computing device system 400 of FIG. 1, in accordance with an embodiment of the invention;

FIG. 5 provides a block diagram illustrating a process flow for determining real-time resource capacity of entity devices based on performing predictive analysis, in accordance with an embodiment of the invention;

FIG. 6 provides a block diagram illustrating a process flow for determining real-time resource capacity of Automated Teller Machines to serve one or more users based on performing predictive analysis, in accordance with an embodiment of the invention; and FIG. 7 provides a graphical representation of determining real-time resource capacity of an Automated Teller Machine to serve one or more users present at the location of the Automated Teller Machine based on performing predictive analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. In some embodiments, the "automated machine" may be any automated device that is involved in distribution of resources such as cash, checks, electronic transfers, money orders or the like which may be performed using a credit card, a debit card, or the like. In one embodiment of the present invention, the automated machine may be an Automated Teller Machine (ATM). In some embodiments, the "automated machine" may be any automated device that provides information associated with resource pools of the user. In some embodiments, the automated machine may be owned and/or controlled by the resource entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems do not have the capability to notify users who are waiting at an entity device to perform interactions as to whether the entity device may able to serve the users or not, thereby driving down the user experience of the users. As such, there exists a need for a system that determines real-time resource capacity of entity devices and notifies users who are waiting to perform interactions. The system of the present invention solves this problem by determining real-time resource capacity of an entity device and notifying the users based on performing predictive analysis of interactions that may occur at the entity device by the users waiting at the location of the entity device.

FIG. 1 provides a block diagram illustrating a system environment 100 for determining real-time resource capacity of entity devices based on performing predictive analysis, in accordance with an embodiment of the invention. As illustrated in FIG. 1, the environment 100 includes an electronic resource request processing system 300, entity system 200, one or more entity devices 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. In some embodiments, the entity is a financial institution. In some embodiments, the one or more entity devices 201 may be owned, operated, controlled, and/or maintained by the entity. Examples of the one or more entity devices may include, but are not limited to, Automated Teller Machines, automated kiosks, associate computing devices (e.g., computing device used by an employee of the entity), or the like that allow a user and/or an associate to access information associated with one or more resource pools of the user or to perform one or more resource interactions associated with the one or more resource pools of the user. In a preferred embodiment of the present invention, the entity device 200 may be an Automated Teller Machine.

The electronic resource request processing system 300 is a system of the present invention for performing one or more process steps described herein. In some embodiments, the electronic resource request processing system 300 may be an independent system. In some embodiments, the electronic resource request processing system 300 may be a part of the entity system 200.

The electronic resource request processing system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the electronic resource request processing system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the electronic resource request processing system 300, and/or entity system 200 across the network 150. In some embodiments of the invention, the computing device system 400 may be a mobile device.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an real-time resource capacity determination application 250, one or more entity applications 270, and a data repository 280 comprising user data 283 and entity device data 285, where the user data 283 comprises data associated with users 110 and/or one or more resource pools associated with the users 110 and the entity device data 285 comprises data associated with one or more entity devices. The one or more entity applications 270 may be any applications provided by the entity that allows users 110 to access information and/or perform one or more actions associated with one or more resource pools of the users 110. The computer-executable program code of the network server application 240, the real-time resource capacity determination application 250, the one or more entity application 270 to perform certain logic, data-extraction, and data-storing functions of the entity system 200 described herein, as well as communication functions of the entity system 200.

The network server application 240, the real-time resource capacity determination application 250, and the one or more entity applications 270 are configured to store data in the data repository 280 or to use the data stored in the data repository 280 when communicating through the network communication interface 210 with the electronic resource request processing system 300, and/or the computing device system 400 to perform one or more process steps described herein. In some embodiments, the entity system 200 may receive instructions from the electronic resource request processing system 300 via the real-time resource capacity determination application 250 to perform certain operations. The real-time resource capacity determination application 250 may be provided by the electronic resource request processing system 300.

FIG. 3 provides a block diagram illustrating the electronic resource request processing system 300 in greater detail, in accordance with embodiments of the invention. As illustrated in FIG. 3, in one embodiment of the invention, the electronic resource request processing system 300 includes one or more processing devices 320 operatively coupled to a network communication interface 310 and a memory device 330. In certain embodiments, the electronic resource request processing system 300 is operated by a first entity, such as a financial institution, while in other embodiments, the electronic resource request processing system 300 is operated by an entity other than a financial institution. In some embodiments, the electronic resource request processing system 300 is owned or operated by the entity of the entity system 200. In some embodiments, the electronic resource request processing system 300 may be an independent system. In alternate embodiments, the electronic resource request processing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the electronic resource request processing system 300 described herein. For example, in one embodiment of the electronic resource request processing system 300, the memory device 330 includes, but is not limited to, a network provisioning application 340, a real-time data extraction application 350, a predictive analysis application 360, an artificial intelligence application 370, a resource capacity determination application 380, and a centralized data repository 390 comprising data processed or accessed by one or more applications in the memory device 330. The computer-executable program code of the network provisioning application 340, the real-time data extraction application 350, the predictive analysis application 360, the artificial intelligence application 370, and the resource capacity determination application 380 may instruct the processing device 320 to perform certain logic, data-processing, and data-storing functions of the electronic resource request processing system 300 described herein, as well as communication functions of the electronic resource request processing system 300.

The network provisioning application 340, the real-time data extraction application 350, the predictive analysis application 360, the artificial intelligence application 370, and the resource capacity determination application 380 are configured to invoke or use the data in the data repository 390 when communicating through the network communication interface 310 with the entity system 200, and/or the computing device system 400. In some embodiments, the network provisioning application 340, the real-time data extraction application 350, the predictive analysis application 360, the artificial intelligence application 370, and the resource capacity determination application 380 may store the data extracted or received from the entity system 200, and the computing device system 400 in the centralized data repository 390. In some embodiments, the network provisioning application 340, the real-time data extraction application 350, the predictive analysis application 360, the artificial intelligence application 370, and the resource capacity determination application 380 may be a part of a single application. The functionalities of the network provisioning application 340, the real-time data extraction application 350, the predictive analysis application 360, the artificial intelligence application 370, and the resource capacity determination application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time resource capacity determination application 421, entity application 424, an SMS application 423, or the like. In some embodiments, the entity application 424 may be an online banking application. The real-time resource capacity determination application 421 may comprise instructions to a graphical user interface (GUI) on the display 430 that allows the user 110 to interact with the entity system 200, the electronic resource request processing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time resource capacity determination application 421 provided by the electronic resource request processing system 300 allows the user 110 to access the electronic resource request processing system 300. In some embodiments, the entity application 424 provided by the entity system 200 and the real-time resource capacity determination application 421 allow the user 110 to access the functionalities provided by the electronic resource request processing system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow 500 for determining real-time resource capacity of entity devices based on performing predictive analysis, in accordance with an embodiment of the invention.

As shown in block 505, the system identifies one or more users at a location of an entity device waiting to perform one or more interactions via the entity device. In some embodiments, the one or more users may be customers of the entity associated with the entity system 200. In some embodiments, the one or more users may not be customers of the entity associated with the entity system 200. As shown in block 510, the system establishes a communication link with the entity device. The system may establish a communication link with entity device via an application located on the entity device, where the application is provided by the system of the present invention.

As shown in block 515, the system determines identity of the one or more users based on communicating with the entity device, via the communication link. The identity of the one or more users is determined based on extracting real-time feed from a camera of the entity device, via the communication link and performing facial recognition based on the real-time feed from the camera of the entity device. For example, the system may extract real-time feed from the camera and may identify that a user 'X' is waiting to perform an interaction at the entity device based on performing facial recognition via an artificial intelligence engine. In some embodiments, the system may communicate with other cameras present at the location of the entity device to extract the real-time feed.

In some embodiments, the system may determine a sequence of the one or more users waiting in a queue based on the real-time feed from the camera of the entity device. Determining the sequence of the one or more users may be performed based on calculating a distance of the one or more users from the entity device based on the real-time feed from the camera of the entity device.

As shown in block 520, the system confirms the identity of the one or more users via an entity application present on one or more user devices of the one or more users. The system may confirm the identity of the one or more users based on determining that a geolocation of the one or more users matches the location of the entity device. Continuing with the previous example, the system may determine the identity of a user as 'X' and may determine the geolocation of user 'X' matches the location of the entity device (e.g., via an online banking application located on the user device of user 'X') to confirm the identity determined by the system in block 515.

As shown in block 525, the system calculates an estimated interaction amount associated with the one or more interactions of the one or more users based on the identity of the one or more users, via an artificial intelligence engine. The system may calculate the estimated interaction amount based on at least one of interaction history and location of the entity device. For example, the system may determine that user 'X' withdraws 'Z' amount first week of every month and may calculate that the user is waiting at the location of the entity device to withdraw 'Z' amount. In another example, the system may determine that user 'X' withdraws 'Y' amount from entity device 'A' and 'YZ' amount from entity device 'B' based on the transaction history of user 'X' and may determine that the user is waiting at the location of the entity device 'A' to withdraw 'Y' amount.

As shown in block 530, the system determines capacity of the entity device in real-time, via the communication link. The system may determine the real-time resources (e.g., cash, available bills, or the like) based on communicating with one or more components of the entity device.

As shown in block 535, the system identifies that the capacity of the entity device does not meet the calculated estimated interaction amount. For example, the system may determine that ten users are waiting at the entity device location and may calculate that the estimated interaction amount associated with all ten users is amount 'D.' Based on the capacity of the entity device, the system may determine that the entity device may not have 'D' amount to serve all ten users. The system may also determine that the entity device has the resources to serve only five out of the ten customers based on the estimated interaction amount and the real-time resources present in the entity device. In some embodiments, the system may draw a virtual line after the fifth user, where the virtual line is drawn on the real-time feed extracted from the camera of the entity device. The system performs these calculations continuously based on the interaction amounts associated with the first five users and may update the prediction of the number of users the entity device can serve using the remaining resources present in the entity device.

As shown in block 540, the system transmits a notification to at least one user of the one or more users via the entity application present on a user device of the at least one user. Continuing with the previous example, the system may transmit a notification to the users that are beyond the virtual line (e.g., five users out of the ten users waiting in the queue) that the entity device may run out of resources by the time it is their turn to perform an interaction. In some embodiments, the system may also display a map with other entity devices that may be able to serve the at least one user.

FIG. 6 provides a block diagram illustrating a process flow for determining real-time resource capacity of Automated Teller Machines to serve one or more users based on performing predictive analysis, in accordance with an embodiment of the invention. As shown in block 605, the system identifies one or more users at a location of an ATM waiting to perform one or more transactions via the ATM. In some embodiments, the one or more users may be customers of a financial institution associated with the entity system 200. In some embodiments, the one or more users may not be customers of the financial institution associated with the entity system 200. As shown in block 610, the system establishes a communication link with the ATM. The system may establish a communication link with the ATM via an application located on the ATM, where the application is provided by the system of the present invention.

As shown in block 615, the system determines identity of the one or more users by performing facial recognition based on a real-time feed from at least one camera of the ATM. The identity of the one or more users is determined based on extracting real-time feed from a camera of the ATM, via the communication link and performing facial recognition based on the real-time feed from the camera of the ATM. For example, the system may extract real-time feed from the camera and may identify that a user 'X' is waiting to perform an transaction at the ATM based on performing facial recognition via an artificial intelligence engine. In some embodiments, the system may communicate with other cameras present at the location of the ATM to extract the real-time feed.

In some embodiments, the system may determine a sequence of the one or more users waiting in a queue based on the real-time feed from the camera of the ATM. Determining the sequence of the one or more users may be performed based on calculating a distance of the one or more users from the ATM based on the real-time feed from the camera of the ATM.

As shown in block 620, the system confirms the identity of the one or more users based on identifying geolocation of the one or more users. The system may confirm the identity of the one or more users based on determining that a geolocation of the one or more users matches the location of the ATM. Continuing with the previous example, the system may determine the identity of a user as 'X' and may determine the geolocation of user 'X' matches the location of the ATM (e.g., via an online banking application located on the user device of user 'X') to confirm the identity determined by the system in block 515.

As shown in block 625, the system calculates an estimated transaction amount associated with the one or more transactions of the one or more users based on the identity of the one or more users, via an artificial intelligence engine. The system may calculate the estimated transaction amount based on at least one of transaction history and location of the ATM. For example, the system may determine that user 'X' withdraws 'Z' amount first week of every month and may calculate that the user is waiting at the location of the ATM to withdraw 'Z' amount. In another example, the system may determine that user 'X' withdraws 'Y' amount from ATM 'A' and 'YZ' amount from ATM 'B' based on the transaction history of user 'X' and may determine that the user is waiting at the location of the ATM 'A' to withdraw 'Y' amount.

As shown in block 630, the system determines capacity of the ATM in real-time, via the communication link. The system may determine the real-time resources (e.g., cash, available bills, or the like) based on communicating with one or more components of the ATM.

As shown in block 635, the system identifies that the capacity of the ATM does not meet the calculated estimated transaction amount. For example, the system may determine that ten users are waiting at the ATM location and may calculate that the estimated transaction amount associated with all ten users is amount 'D.' Based on the capacity of the ATM, the system may determine that the ATM may not have 'D' amount to serve all ten users. The system may also determine that the ATM has the resources to serve only five out of the ten customers based on the estimated transaction amount and the real-time resources present in the ATM. In some embodiments, the system may draw a virtual line after the fifth user, where the virtual line is drawn on the real-time feed extracted from the camera of the ATM and/or cameras present at the location of the ATM. The system performs these calculations continuously based on the transaction amounts associated with the first five users and may update the prediction of the number of users the ATM can serve using the remaining resources present in the ATM.

As shown in block 640, the system transmits a notification to at least one user of the one or more users via an online banking application present on a mobile device of the at least one user. Continuing with the previous example, the system may transmit a notification to the users that are beyond the virtual line (e.g., five users out of the ten users waiting in the queue) that the ATM may run out of resources by the time it is their turn to perform a transaction. In some embodiments, the system may also display a map with other ATMs that may be able to serve the at least one user.

FIG. 7 provides a graphical representation of determining real-time resource capacity of an Automated Teller Machine to serve one or more users present at the location of the Automated Teller Machine based on performing predictive analysis, in accordance with an embodiment of the invention. As shown, one or more users (e.g., User '1' 701, User '2' 702, User '3' 703, User '4' 704, User '5' 705, User '6' 706, User '7' 707, through User 'N' 708) may be waiting in a queue to perform one or more transactions at ATM 710. Upon determining that the one or more users are waiting at the ATM 710 via a real-time camera feed (e.g., from the camera of the ATM 710 or one more cameras present at the location of the ATM 710), the system performs facial recognition to determine identity of the one or more users and calculates an estimated transaction amount of the one or more transactions that may be performed at the ATM 710 by the one or more users as explained in FIG. 5 and FIG. 6. The system then communicates with the ATM 710 to determine real-time resources present in the ATM 710 and compares the estimated transaction amount with the real-time resources present in the ATM 710. Upon comparison, the system may determine that the ATM 710 may run out of resources after serving User '5' 705 as shown and may draw a virtual line 730 after User '5' 705. The system then transmits notifications to users present after the virtual line 730 (i.e., User '6' 706, User '7' 707, through User 'N' 708), where the notification notifies the users that the ATM 710 may not be able to serve them. In some embodiments, the notification further comprises location of other ATMs that may be able to serve the users.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semi-conductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining real-time resource capacity of entity devices based on performing predictive analysis, the system comprising:
    a memory device with computer-readable program code stored thereon;
    a communication device; and a processing device operatively coupled to the memory device and the communication device, wherein the processing device is configured to execute the computer-readable program code to:
        identify one or more users at a location via a real-time feed of a camera of an entity device waiting to perform one or more future interactions via the camera of the entity device and one or more cameras present at a location associated with the entity device;
        establish a communication link with the entity device;
        determine identity of the one or more users based on communicating with the entity device, via the communication link;
        confirm the identity of the one or more users via an entity application present on one or more user devices of the one or more users;
        calculate an estimated interaction amount associated with the one or more future interactions of the one or more users to be performed at the entity device based on the identity of the one or more users, via an artificial intelligence engine;
        determine capacity of the entity device in real-time, via the communication link;
        identify that the capacity of the entity device does not meet the calculated estimated interaction amount;
        draw a virtual line before the at least one user based on determining that the capacity of the entity device does not meet the calculated estimated interaction amount of the one or more users, wherein the virtual line is drawn on the real-time feed from the camera of the entity device; and in response to identifying that the capacity of the entity device does not meet the calculated estimated interaction amount, transmit a notification to at least one user of the one or more users via the entity application present on a user device of the at least one user.

2. The system according to claim 1, wherein the processing device is further configured to execute the computer-readable program code to determine the identity of the one or more users based on: extracting the real-time feed from the camera of the entity device, via the communication link; and performing facial recognition based on the real-time feed from the camera of the entity device.

3. The system according to claim 2, wherein the processing device is further configured to execute the computer-readable program code to determine a sequence of the one or more users waiting in a queue based on the real-time feed from the camera of the entity device.

4. The system according to claim 3, wherein the processing device is further configured to execute the computer-readable program code to determine the sequence of the one or more users based on calculating a distance of the one or more users from the entity device based on the real-time feed from the camera of the entity device.

5. The system according to claim 1, wherein the processing device is further configured to execute the computer-readable program code to confirm the identity of the one or more users based on determining that a geolocation of the one or more users matches the location of the entity device.

6. The system according to claim 1, wherein the processing device is further configured to execute the computer-readable program code to calculate the estimated interaction amount based on at least one of interaction history and location of the entity device.

7. A computer program product for determining real-time resource capacity of entity devices based on performing predictive analysis, the computer program product comprising at least one non-transitory computer readable medium having computer-readable program code portions embodied therein, the computer-readable program code portions comprising executable portions for:
identifying one or more users at a location via a real-time feed of a camera of an entity device waiting to perform one or more future interactions via the camera of the entity device and one or more cameras present at a location associated with the entity device;
establishing a communication link with the entity device;
determining identity of the one or more users based on communicating with the entity device, via the communication link;
confirming the identity of the one or more users via an entity application present on one or more user devices of the one or more users;
calculating an estimated interaction amount associated with the one or more future interactions of the one or more users to be performed at the entity device based on the identity of the one or more users, via an artificial intelligence engine;
determining capacity of the entity device in real-time, via the communication link;
identifying that the capacity of the entity device does not meet the calculated estimated interaction amount;
drawing a virtual line before the at least one user based on determining that the capacity of the entity device does not meet the calculated estimated interaction amount of the one or more users, wherein the virtual line is drawn on the real-time feed from the camera of the entity device; and
in response to identifying that the capacity of the entity device does not meet the calculated estimated interaction amount, transmitting a notification to at least one user of the one or more users via the entity application present on a user device of the at least one user.

8. The computer program product of claim 7, wherein the computer-readable program code portions comprising executable portions for determining the identity of the one or more users based on:
extracting the real-time feed from the camera of the entity device, via the communication link; and
performing facial recognition based on the real-time feed from the camera of the entity device.

9. The computer program product of claim 8, wherein the computer-readable program code portions comprising executable portions for determining a sequence of the one or more users waiting in a queue based on the real-time feed from the camera of the entity device.

10. The computer program product of claim 9, wherein the computer-readable program code portions comprising executable portions for determining the sequence of the one or more users based on calculating a distance of the one or more users from the entity device based on the real-time feed from the camera of the entity device.

11. The computer program product of claim 7, wherein the computer-readable program code portions comprising executable portions for confirming the identity of the one or more users based on determining that a geolocation of the one or more users matches the location.

12. A computer-implemented method for determining real-time resource capacity of entity devices based on performing predictive analysis, the method comprising:
identifying one or more users at a location via a real-time feed of a camera of an entity device waiting to perform one or more future interactions via the camera of the entity device and one or more cameras present at a location associated with the entity device;
establishing a communication link with the entity device;
determining identity of the one or more users based on communicating with the entity device, via the communication link;
confirming the identity of the one or more users via an entity application present on one or more user devices of the one or more users;
calculating an estimated interaction amount associated with the one or more future interactions of the one or more users to be performed at the entity device based on the identity of the one or more users, via an artificial intelligence engine;
determining capacity of the entity device in real-time, via the communication link;
identifying that the capacity of the entity device does not meet the calculated estimated interaction amount;
drawing a virtual line before the at least one user based on determining that the capacity of the entity device does not meet the calculated estimated interaction amount of the one or more users, wherein the virtual line is drawn on the real-time feed from the camera of the entity device; and
in response to identifying that the capacity of the entity device does not meet the calculated estimated interaction amount, transmitting a notification to at least one user of the one or more users via the entity application present on a user device of the at least one user.

13. The computer-implemented method of claim 12, wherein determining the identity of the one or more users is based on: extracting the real-time feed from the camera of the entity device, via the communication link; and performing facial recognition based on the real-time feed from the camera of the entity device.

14. The computer-implemented method of claim 13, wherein the method further comprises determining a sequence of the one or more users waiting in a queue based on the real- time feed from the camera of the entity device.

15. The computer-implemented method of claim 14, wherein determining the sequence of the one or more users based on calculating a distance of the one or more users from the entity device based on the real-time feed from the camera of the entity device.

16. The computer-implemented method of claim 12, wherein the method further comprises confirming the identity of the one or more users based on determining that a geolocation of the one or more users matches the location of the entity device.

17. The computer-implemented method of claim 12, wherein calculating the estimated interaction amount is based on at least one of interaction history and location of the entity device.

\* \* \* \* \*